(12) United States Patent
Caldwell (10) Patent No.: US 6,557,879 B2
(45) Date of Patent: May 6, 2003

(54) LAND ROWER

(76) Inventor: John R. Caldwell, 3700 Hearst Castle Way, Plano, TX (US) 75025

( * ) Notice: Subject to any disclaimer, the term of this patent is extended or adjusted under 35 U.S.C. 154(b) by 0 days.

(21) Appl. No.: 09/780,541

(22) Filed: Feb. 14, 2001

(65) Prior Publication Data

US 2001/0038189 A1 Nov. 8, 2001

Related U.S. Application Data

(62) Division of application No. 09/209,797, filed on Dec. 11, 1998, now Pat. No. 6,276,703.

(51) Int. Cl.$^7$ ................................................ B62M 1/14
(52) U.S. Cl. ............................... 280/242.1; 280/288.1; 280/211; 280/250; 280/250.1; 280/261; 280/264
(58) Field of Search ............................ 280/288.1, 282, 280/242.1, 211, 250, 220, 226.1, 227, 229, 238, 249, 250.1, 259, 260, 261, 264, 265

(56) References Cited

U.S. PATENT DOCUMENTS

| | | | |
|---|---|---|---|
| 287,789 A | 11/1883 | Arbogast | 280/211 |
| 2,436,619 A | 2/1948 | Swindell | 280/211 |
| 2,946,602 A | 7/1960 | Lee | 280/211 |
| 3,052,486 A | 9/1962 | Malmquist | 280/211 |
| 3,301,574 A | 1/1967 | Good | 280/211 |
| 3,450,416 A | 6/1969 | Mulder | 280/211 |
| 3,563,568 A | 2/1971 | Sasse et al. | 280/250.1 X |
| 4,066,273 A | 1/1978 | Lohr | 280/211 |
| 4,077,647 A | 3/1978 | Nagayama | 280/211 |
| 4,109,927 A | 8/1978 | Harper | 280/250 |
| 4,272,095 A | 6/1981 | Ptaszek | 280/282 X |
| 4,274,651 A | 6/1981 | Dumont | 280/250.1 |
| 4,283,070 A | 8/1981 | Forestall et al. | 280/220 X |
| 4,506,901 A | 3/1985 | Tosti | 280/250.1 |
| 4,572,535 A | 2/1986 | Stewart et al. | 280/282 |
| 4,655,470 A | 4/1987 | Lin | 280/211 |
| 4,674,762 A | 6/1987 | Nelson et al. | 280/282 |

(List continued on next page.)

OTHER PUBLICATIONS

Freedom Ryder Brochure, Brke International, Ltd.
Action Top End® Eliminator™ Brochure, Action Top End, Invacare Corporation.
Specialized Smart Products Catelog 1997, pp. 41 and 95.
1997 Shimano Catalog, pp. 70, 71.
Damark Catalog, p. 32 UFO Vehicle.
Action Top End Excelerator—XLT Flyer by Invacare Corporation.
Action Top End Eliminator Series Flyer by Invacare Corporation.
Cole, "The Handbike from New Dimensions Design", www.gallaudet.edu/~kjcole/handbike.html, 1995.

*Primary Examiner*—F. Zeender
(74) *Attorney, Agent, or Firm*—David W. Carstens; Carstens Yee & Cahoon LLP (57) ABSTRACT

This is a hand-propelled wheeled device for a rider. The device includes: a frame with two sides; a first and second drive wheel rotatably mounted to the two sides; a first hand crank connected to the first drive wheel through a first crank hub, and a first wheel hub that is connected to and rotates the first drive wheel; a second hand crank connected to the second drive wheel through a second crank hub, and a second ratcheting hub that is connected to and rotates the second drive wheel; at least one shifting mechanism to change a leveraging ratio between the first hand crank and the first drive wheel and between the second hand crank and the second drive wheel; a pivoting backrest connected to the frame, wherein the pivoting backrest provides continuous back support to the rider; an adjustable hammock seat connected to the frame; a third support connected to the frame; and a braking mechanism to retard movement of the first and second drive wheels.

14 Claims, 10 Drawing Sheets

U.S. PATENT DOCUMENTS

| | | |
|---|---|---|
| 4,682,784 A | 7/1987 | Anderson ................ 280/250.1 |
| 4,705,284 A | 11/1987 | Stout ....................... 280/250.1 |
| 4,727,965 A | 3/1988 | Zach et al. .......... 280/250.1 X |
| 4,758,013 A | 7/1988 | Agrillo ................... 280/250.1 |
| 4,789,173 A | 12/1988 | Lofgren et al. ......... 280/282 X |
| 5,028,064 A | 7/1991 | Johnson .................. 280/250.1 |
| 5,037,120 A | 8/1991 | Parisi ..................... 280/250.1 |
| 5,228,709 A | 7/1993 | Kao ........................ 280/250.1 |
| 5,232,236 A | 8/1993 | Korpi ..................... 280/250.1 |
| 5,322,312 A | 6/1994 | Cammack ................ 280/250.1 |
| 5,354,084 A | 10/1994 | Lofgren et al. ............. 280/250 |
| 5,482,305 A | 1/1996 | Jeffries et al. ........... 280/250.1 |
| 5,486,016 A | 1/1996 | Godin et al. ............. 280/250.1 |
| 5,769,441 A | 6/1998 | Namngani .............. 280/211 X |
| 5,826,897 A | 10/1998 | Beard ..................... 280/250.1 |
| 5,853,184 A | 12/1998 | Lofgren et al. ......... 280/250 X |
| 5,865,455 A | 2/1999 | Taylor ................... 280/238 X |
| 6,158,757 A * | 12/2000 | Tidcomb ................... 280/244 |

* cited by examiner

LAND ROWER

CROSS REFERENCE

This is a divisional of application Ser. No. 09/209,797 filed on Dec. 11, 1998 now U.S. Pat. No. 6,276,703.

FIELD OF THE INVENTION

The present invention relates generally to arm powered vehicles, specifically to vehicles propelled by handles mounted on the inside of the right and left drive wheels. The rider uses a circular motion for propulsion.

BACKGROUND FOR INVENTION

Most racing wheelchairs are propelled by pushrims on the outside of the two drive wheels. The rider reaches back and puts the heels of their hands on the pushrims of the two drive wheels. They then push the pushrims down as the wheels rotate.

There are several weaknesses to this design. First, this design is inefficient, having considerable lost and wasted motion. The power stroke is only approximately one fifth of a revolution requiring one's hands and arms to return to the starting position after each power stroke. During the return stroke, energy is consumed but not transmitted to the drive wheels as the hands return empty to the original position. Not only is this inefficient, but during this time the wheelchair is out of control and can be particularly dangerous when ascending or descending a ramp or other irregular terrain. Second, this type of motion can also lead to repetitive motion injuries such as carpal tunnel syndrome. Third, the rider's high position produces a high center of gravity. Fourth, the rider can only inefficiently brake by pushing their hands against the tires or pushrims.

Advanced racing wheelchairs address these weaknesses by having a small diameter push rim for higher top speed, drive wheels that tilt out at the bottom for stability and an extended front wheel for balance. They are available from such firms as Invacare and Sunrise Medical.

Many attempts have been tried to change the basic wheelchair design for use by both physically challenged and able-bodied people. They usually fall into five main groups.

The first group uses levers. This group includes:

| U.S. Pat. No. | Inventor | Title | Date |
| --- | --- | --- | --- |
| 4,682,784 | Anderson | Wheelchair with Variable Ratio Propulsion | Jul 28, 1987 |
| 4,705,284 | Stout | Human Powered Vehicle | Nov 10, 1987 |

The second group has pushrims outside the two drive wheels. This group includes:

| U.S. Pat. No. | Inventor | Title | Date |
| --- | --- | --- | --- |
| 5,028,064 | Johnson | Racing Wheelchair | Jul 3, 1991 |
| 3,563,568 | Sasse | Variable Rotary Drive Mechanism for Wheel Chairs | Feb 16, 1971 |
| 4,727,965 | Zach | Geared Hub with Freewheel for Wheel-Chairs | Mar 1, 1988 |

The third group has small handles outside the two drive wheels. This group includes:

| U.S. Pat. No. | Inventor | Title | Date |
| --- | --- | --- | --- |
| 5,037,120 | Parisi | Wheelchair Manual Drive Mechanism | Aug 6, 1991 |
| 4,758,013 | Agrillo | Hand Crank Wheelchair Drive | Jul 19, 1988 |

The fourth group has direct drive handles inside the two drive wheels. This group includes:

| U.S. Pat. No. | Inventor | Title | Date |
| --- | --- | --- | --- |
| 4,066,273 | Lobar | Toy Car | Jan 3, 1978 |
| 4,655,470 | Lin | Hand-propelled Wheeled Device for Children | Apr 7, 1987 |

The fifth group has hand cranks in front of the rider using a chain to drive one wheel in front. This group includes:

| U.S. Pat. No. | Inventor | Title | Date |
| --- | --- | --- | --- |
| 4,109,927 | Harper | Hand Powered and Controlled Tricycle | Aug 29, 1978 |

U.S. Pat. Nos. 4,682,784 and 4,705,284 both use dual reciprocating levers, and have several speeds. The required push/pull arm motion does not fully use the rider's muscles (only the push moves the vehicle) and the high sitting position (about 13") is unstable in turns.

U.S. Pat. No. 5,028,064 has a low, stable sitting position but still uses pushrims. Also, the rider can not easily move back and forth, thus preventing the abdominal and back muscles from helping propel the vehicle.

U.S. Pat. Nos. 3,563,568 and #4,727,965 have multiple speeds but also have pushrims and a high sitting position.

U.S. Pat. No. 5,037,120 has an efficient circular arm motion. However, a high sitting position, no brakes, and a rigid seat back hamper the rider's performance. In addition, the this design has no coasting feature.

U.S. Pat. No. 4,758,013 has an efficient circular arm motion, brakes and reverse. However, a high sitting position, rigid seat back, and lack of easy frame adjustment also hamper the rider's performance.

While U.S. Pat. Nos. 4,066,273 and 4,655,470 use the major muscle groups and have a low, stable seat, they have only one speed, cannot freewheel, and have no brakes. A similar device for children is commercially available through Lakeside Learning.

U.S. Pat. No. 4,109,927 has a front wheel that is driven by a chain connected to a hand cranked mechanism. The crank and front wheel look like the pedals and back wheel of a bicycle. This concept has an efficient circular arm motion, plurality of speeds and brakes. However, performance is hampered in this model because the rider cannot turn quickly. The front wheel is between the rider's legs and so its turning angle is limited. Also, sudden stops can cause the rider's chest to impact the chain sprocket. Similar devices are commercially available through Invacare, Sunrise Medical and Brike.

In addition, none of these patents show a seat that is comfortable for long periods. The seats are also not ventilated and provide no support for the rider as they rock back and forth. Moreover, most of these patents show a frame that cannot be adjusted for different sized riders.

It has been shown that the choices in outdoor exercise for physically challenged athletes have limitations. Furthermore, even able-bodied people have limited choices in physical exercise for the upper body. Millions of people run, bicycle, or rollerblade. However, all these exercises are for the lower body. There are few outdoor exercises for the upper body. Two choices are swimming and rowing, but lap pools and lakes are not readily available to most people. The arm-powered Land Rower will give able-bodied, as well as physically challenged, athletes a unique and well designed choice for upper body exercise.

SUMMARY OF THE INVENTION

The present invention is an arm-powered wheeled vehicle for outdoor, upper body exercise. Its main components are a substantially rectangular frame and two drive wheels, which are rotatably mounted along two opposite and parallel sides of the frame. Each side has a rotating handle driving an handle hub attached to a chain that in turn drives a ratcheting hub on the wheel. Different gears or leverages are incorporated in the rotating handle, the handle hub, the ratcheting hub, or any combination of the three. The rider uses a circular motion for propulsion by turning the rotating handle that subsequently drives the wheel. The vehicle has independent right and left brakes for the two drive wheels and a pivoting, adjustable third wheel mounted to the frame in front of the rider. A hammock like seat is attached to the front and rear of the vehicle and passes through a pivoting back support, giving the rider a comfortable, performance-enhancing position. In addition, the pivoting back allows for continuous support while the rider is moving back and forth while rotating the handle. The locations of the back, leg, and foot supports are adjustable. The vehicle can be configured for use by either physically challenged or able-bodied riders.

It is therefore a broad object of this invention to provide an arm-powered vehicle that can be used by both physically challenged and able-bodied riders.

It is another object of this invention to provide a vehicle that is propelled by the rider in an efficient way using the large muscles of the upper body in a full range of motion. This object can be accomplished by having the rider use a circular motion for propulsion with power being generated during the entire cycle.

It is another object of this invention to provide a propulsion method as described above that includes a means to change the gear ratio between the handles and the drive wheels to permit selection of optimum leverages for a particular situation.

It is another object to have a propulsion system that freewheels or coasts when the rider does not need to propel the vehicle.

It is another object to have right and left brakes that can be applied independently. The stopping forces should be transmitted to the frame rather than against the rider's arms.

It is another object of this invention to provide a performance enhancing seat that is comfortable and lets the rider make efficient use of their upper body power.

It is another object of this invention to produce a stable vehicle by having a low sitting position.

It is another object to this invention to have a very maneuverable vehicle. Because it is stable and can pivot on one wheel, the Land Rower can safely have a short turning radius. This object is accomplished by having the rider change direction by using different power to the two drive wheels or by differential braking.

It is another object of this invention to have the vehicle be adjustable for different sized riders.

It is another object of this invention to have a vehicle that can be easily disassembled for transport.

It is another object of this invention to use existing technology so the Land Rower can be manufactured easily.

Some of the advantages of the present invention include: an efficient propulsion design; a multi-speed transmission; downhill coasting; comfortable, performance enhancing seat; stability and maneuverability; improved brakes; and an adjustable frame.

These, and other objects and advantages of the present invention, will become more apparent from a consideration of the detailed description of the preferred embodiments, when read in conjunction with the accompanying drawings.

BRIEF DESCRIPTION OF THE DRAWINGS

For a more complete understanding of the present invention, and the advantages thereof, reference is now made to the following descriptions taken in conjunction with the accompanying drawings, in which:

FIG. 3a shows a view of the crank handle and two optional slide bars;

FIG. 3b shows the crank handle from a reverse direction of FIG. 3a;

DETAILED DESCRIPTION

Chassis

Figure 1:
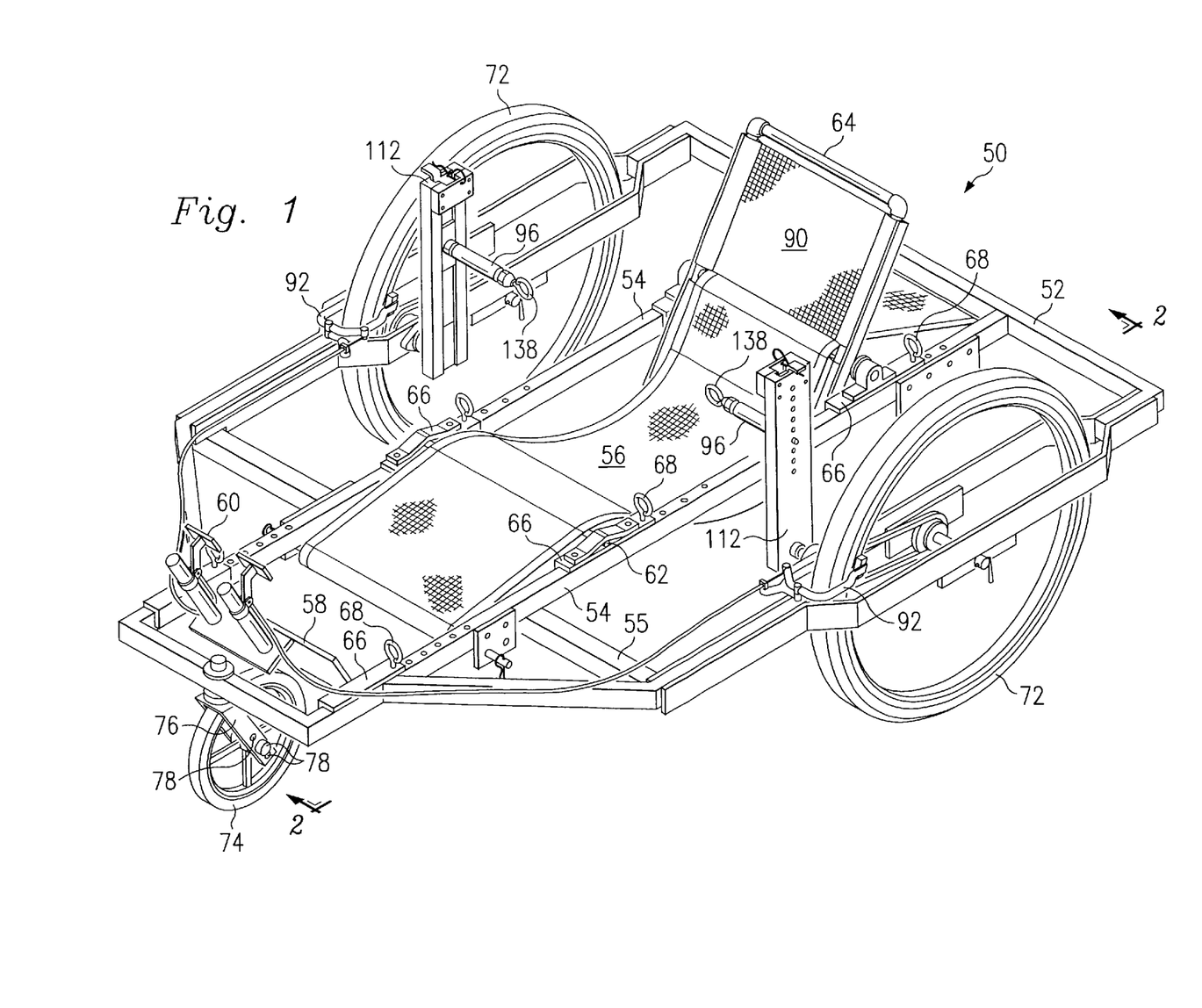
FIG. 1 shows the preferred embodiment from a top view.
Figure 2:
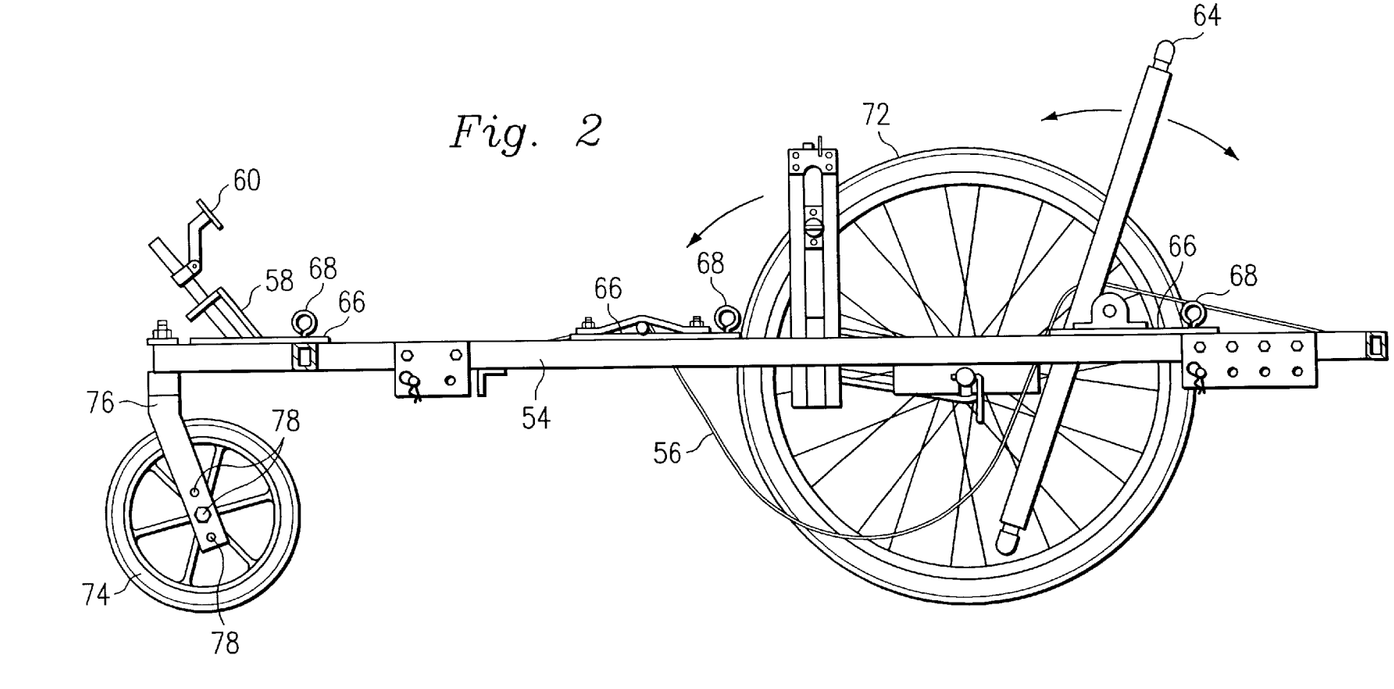
FIG. 2 shows the preferred embodiment from a side view only showing one wheel and illustrates the motion of the pivoting back support and the motion of the crank handle.

Referring now to FIG. 1, a preferred embodiment of the Land Rower 50 is illustrated in which a frame 52 is constructed of rectangular aluminum tubing and ¼ aluminum bar stock. Although, aluminum is used, a variety of materials can be substituted, including, but not limited to, steel tubing, graphite material, carbon fiber, etc.

The frame 52 has two joists 54 running down the middle to support the hammock seat 56. In this model, the joists 54 are 16" apart on the inside. The joists 54 are also made from rectangular aluminum tubing. The footrest 58 is mounted between the joists 54 with foot activated brakes 60, a leg support 62 and a pivoting back support 64. These three supports are each attached to sliding attachments 66 which slide along the tubing. The location of the supports is adjusted by taking out the locking pins 68 in the tops of the sliding attachments 66, sliding the attachments 66, and reinserting the locking pins 68.

The chassis is stiffened in this model by a brace 55 which runs across the Land Rower in front of the drive wheels In front of the rider is a pivoting front wheel 74. The front wheel 74 can pivot and be raised or lowered. The wheel assembly consists of a fork component 76 and a wheel 74. The bottom of the fork component has a plurality of holes 78 on each side so the wheel can be raised or lowered. Raising and lowering the wheel 74 lowers and raises the front of the Land Rower along with the rider's sitting position. The wheel 74 pivots as the rider turns. The two drive wheels 72 and the pivoting front wheel 74 give the Land Rower three points of contact with the ground and thus making it inherently stable. However, the design of the Land Rower could be easily accommodated to reverse the position of the two drive wheels and the front wheel to put the drive wheels in front and the third wheel behind the rider. In addition, the Land Rower could also be adapted to use a type of ski as the third wheel and chains or tracks for the drive wheels in snow and ice conditions. Moreover, the drive wheels and third wheel could also include shock absorbers or chain tensioners.

Hammock Seat and Backrest

Figure 4:
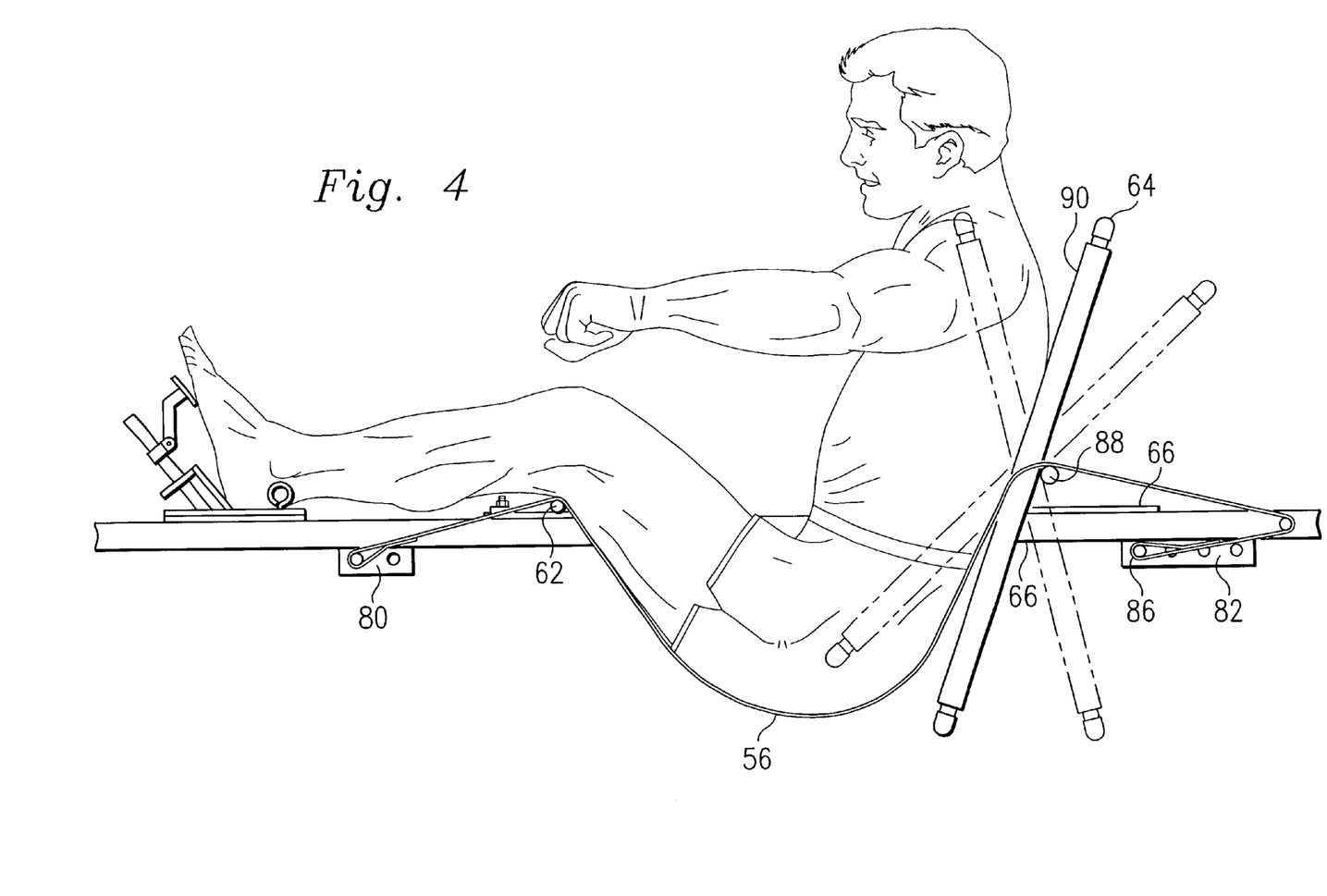
FIG. 4 shows a view of a rider in the preferred embodiment and illustrates the pivoting back support.

Now referring to FIG. 4, the pivoting backrest 64 is very advantageous because it allows the rider to rock back and forth; the action is similar to rowing. The design and pivoting action of the backrest 64 gives the rider continuous, seamless support and minimizes back fatigue. The backrest perimeter frame is made from tubing with cloth 90 stretched horizontally above and below the pivoting support rod 88. The pivoting support rod 88 is attached to the backrest 64 and goes through two bearings mounted on the sliding devices 66 (shown in FIG. 1) on the right and left joists. The location of the backrest's top cloth 90 leaves about a ½" gap above the rod 88. The hammock 56 runs through this gap and over the pivoting rod 88. The backrest 64 is able to pivot because the rod 88 can rotate in the bearings inside the sliding devices 66. The rider's back gets full support because the hammock passes through the seat.

Figure 5:
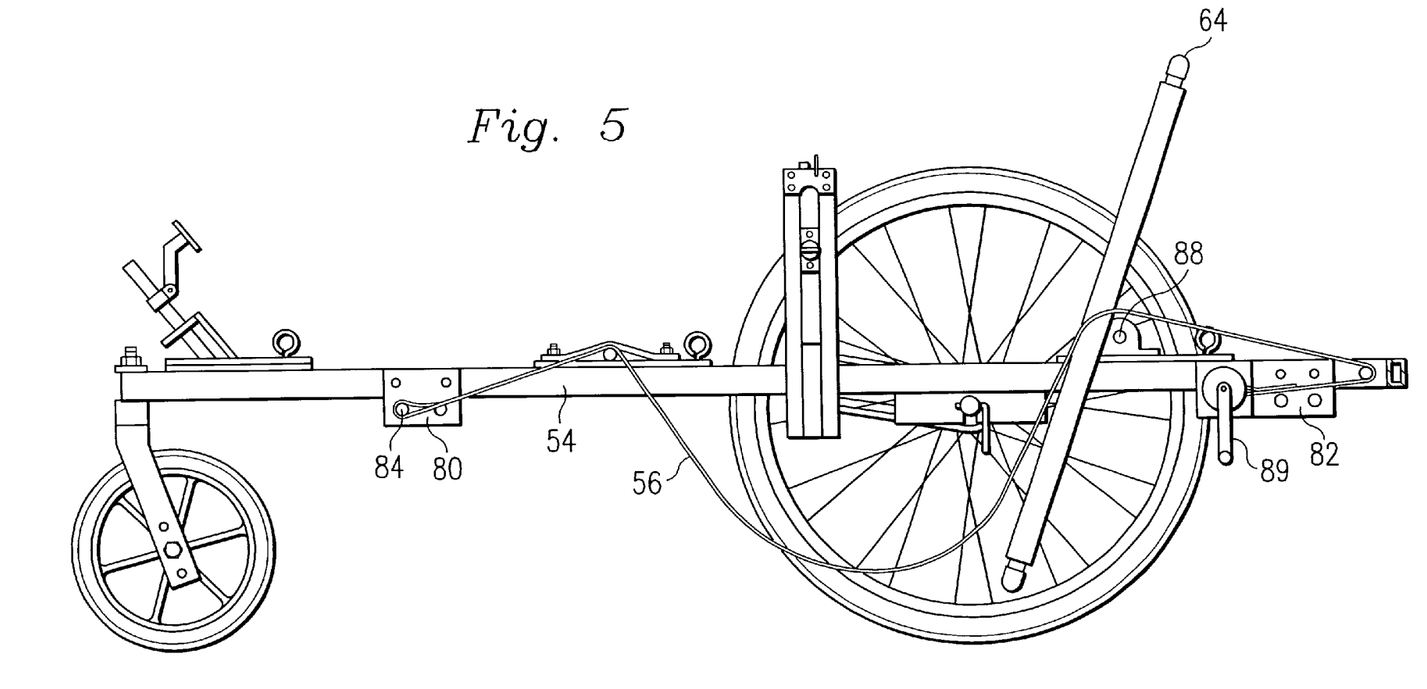
FIG. 5 shows the preferred embodiment from a side view only showing one wheel and is taken from cutout 2 of FIG. 1.

Now referring to FIG. 5, the hammock 56 is made of a breathable, washable material and passes through the pivoting backrest 64. The hammock 56 is attached to a front attachment 80 and to a back attachment 82. The height of the rider above the ground can be adjusted by adjusting the front and back attachments 80, 82. The preferred embodiment is implemented with the hammock looped around a ½" tube 84 between the joists in the front and a 1" tube 86 in the back. The back tube 86 projects about 2" from the joist on the right side and has a folding crank for turning the tube to adjust the seat height. A hole on the left side is for the locking pin. To adjust the seat height, the rider holds the crank, the locking pin is removed, the crank used to rotate the tube, and the locking pin put back.

This hand crank feature lets the physically challenged rider slide from their wheelchair across a flat surface and then loosen the hammock for stability. When the ride is over, they can crank the hammock flat again and slide back into their wheelchair.

Figure 6:
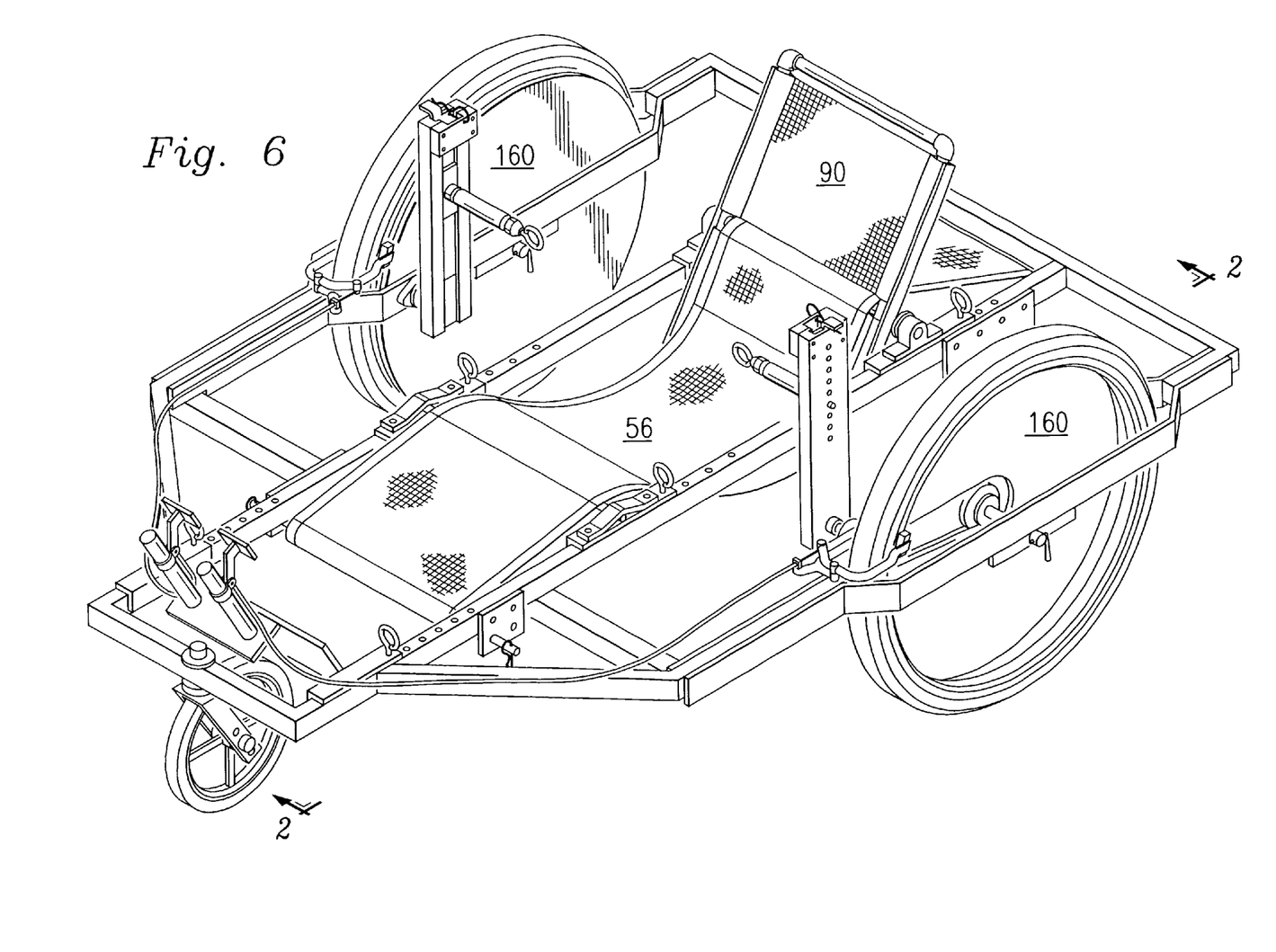
FIG. 6 shows the preferred embodiment from a top view and also illustrates the safety shield between the rider and the wheel spokes.

Now referring to FIG. 6, optional wheel guard 160 protects the rider from the spokes of the drive wheels. The wheel guard 160 is preferably composed of any durable, lightweight material that will protect the rider and the spokes of wheel.

Brakes

The brakes can be used to slow the Land Rower's speed, as well as, for steering the Land Rower. Now referring to FIG. 1, bicycle caliper brakes 92 are setup to squeeze the rims of the drive wheel 72 in order to slow down the Land Rower. The rider could also steer the Land Rower by independently activating the right and left brakes. The very low center of gravity and resulting stability lets the rider safely turn with surprising speed. The brakes can be activated by a variety of embodiments. One embodiment would have foot activated brakes as part of the footrest is depicted in FIG. 1. In this embodiment, the rider would activate the brakes by pressing down on either the right or the left foot brake 60. The depressed foot brake 60 would then operate the caliper brakes 92 to retard the movement of the drive wheels 72. The brake pedals on FIG. 1 can be raised or lowered also.

Figure 8:
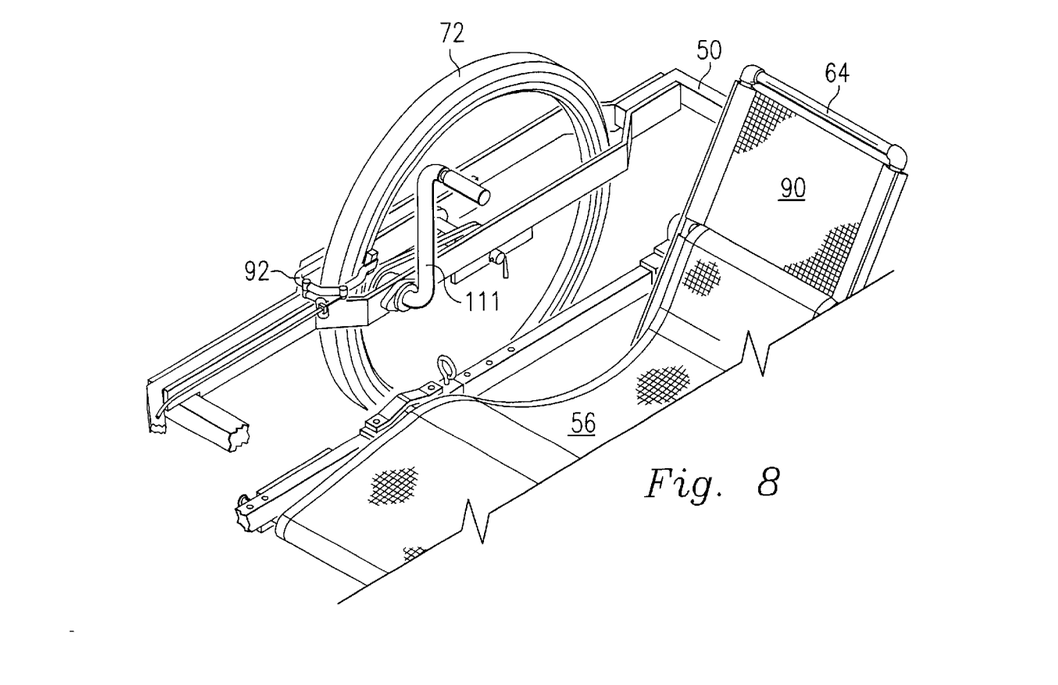
FIG. 8 shows an alternate embodiment the crank handle.

Another embodiment uses a Shimano Nexxus hub with coaster brakes as depicted in FIG. 8. In this embodiment, the rider would just start to rotate the crank handles 111 in reverse to stop the drive wheels 72. In this embodiment, the crank handle 111 is more streamlined than crank handle depicted in FIG. 1 since it does not include the template for gear shifting.

Figure 9:
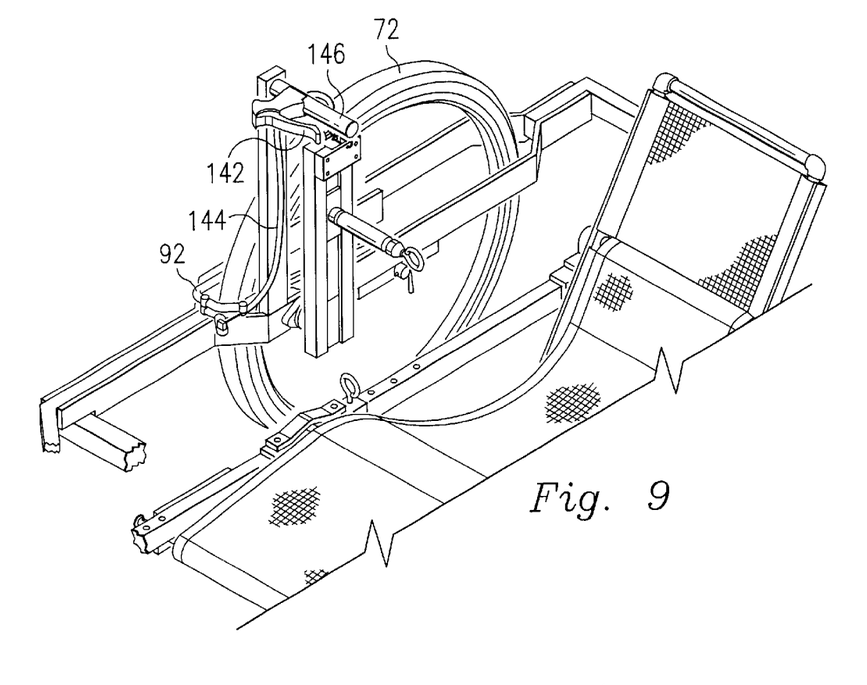
FIG. 9 shows an alternate embodiment for the brakes.

Another alternative is to have the brakes mounted on handles above the drive wheels as depicted in FIG. 9. In this embodiment, another handle 146 extends just beyond the path of the rider's hand as it revolves the crank handle. The rider would activate the brakes by squeezing the brake handle 142 with their hands. The brake handle 142 would then active the caliper brakes 92 to retard the movement of the drive wheel 72.

Figure 10:
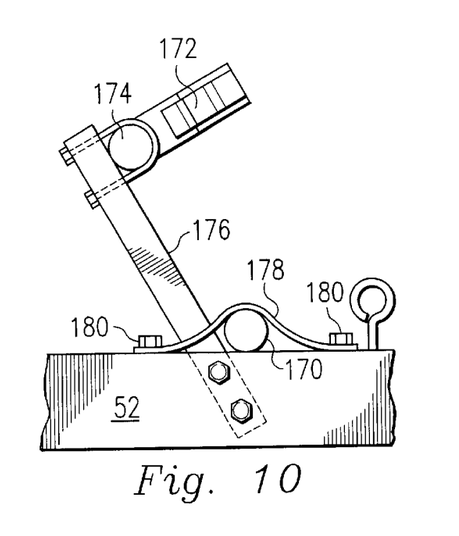
FIGS. 10–13 show an alternate embodiment for the brakes.

Another emodiment for the brakes is depicted in FIGS. 10–13. In this embodiment, the rider rests their feet on the foot rest bar 170 as depicted in FIG. 10. When the rider wants to brake, they push their feet forward to push on the brake pedals 172. The brake pedals 172 are attached to a brake bar 174. The brake bar 174 can be raised or lowered on the brake bar support 176 in the relation to the foot rest bar 170 to accommodate different sized people. The foot rest bar 170 is attached to frame 52 by a strap 178 that is attached by bolts 180. The brake pedal 174 would also be attached to a brake cable 182 that activates the caliper brakes (not shown).

Figure 11:
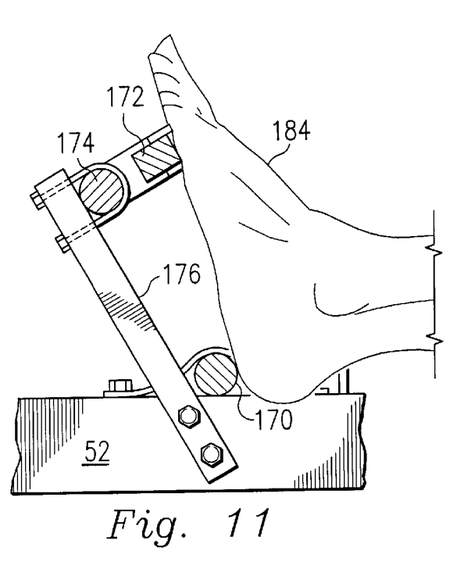

Now referring to FIG. 11, the rider's foot 184 rests on the foot rest bar 170 and when needed, pushes on brake pedal 172 mounted on the brake bar 174.

Figure 12:
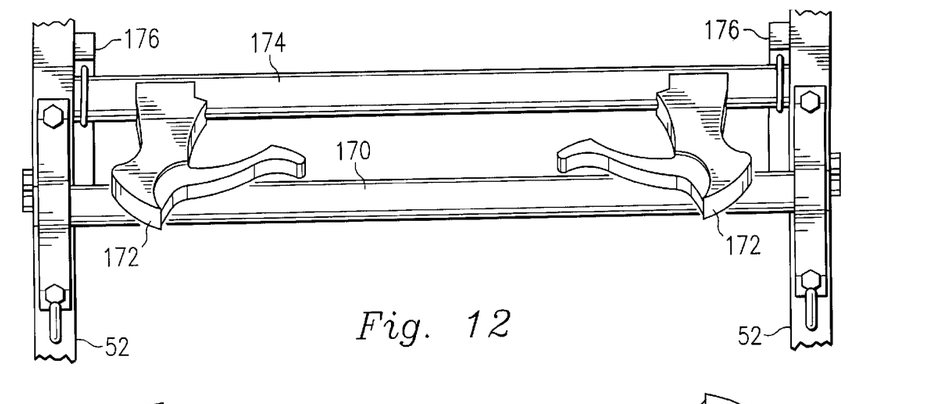

FIG. 12 shows the top view of how the foot rest bar 170, the brake pedals 172, the brake bar 174 and the brake bar supports 176 are attached to frame 52.

Figure 13:
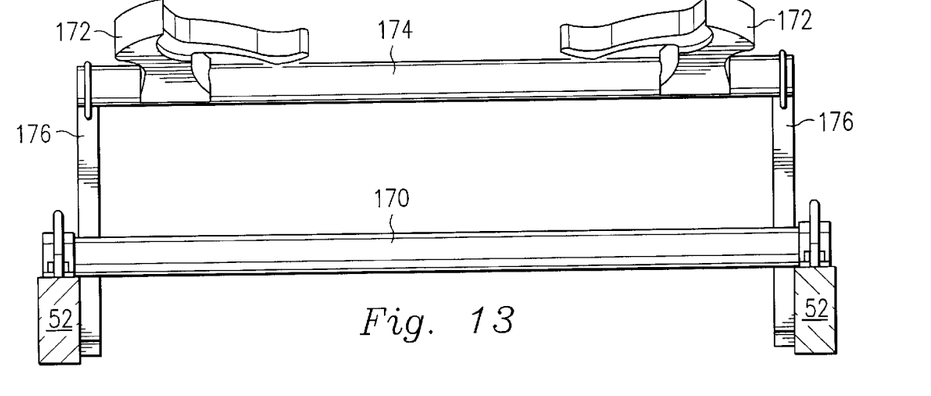

FIG. 13 shows the back view of how the foot rest bar 170, the brake pedals 172, the brake bar 174 and the brake bar supports 176 are attached to frame 52.

Drive Mechanism

The drive mechanism can be implemented in a variety of embodiments. One embodiment utilizes a template method to change gear ratios between the crank handle, and the drive wheel hub. The concept behind the template is for the handle to be farther from the axle of the handle hub when leverage is needed (starting and uphill) and closer to the axle when speed is required (level and downhill).

Figures 3A, 3B:
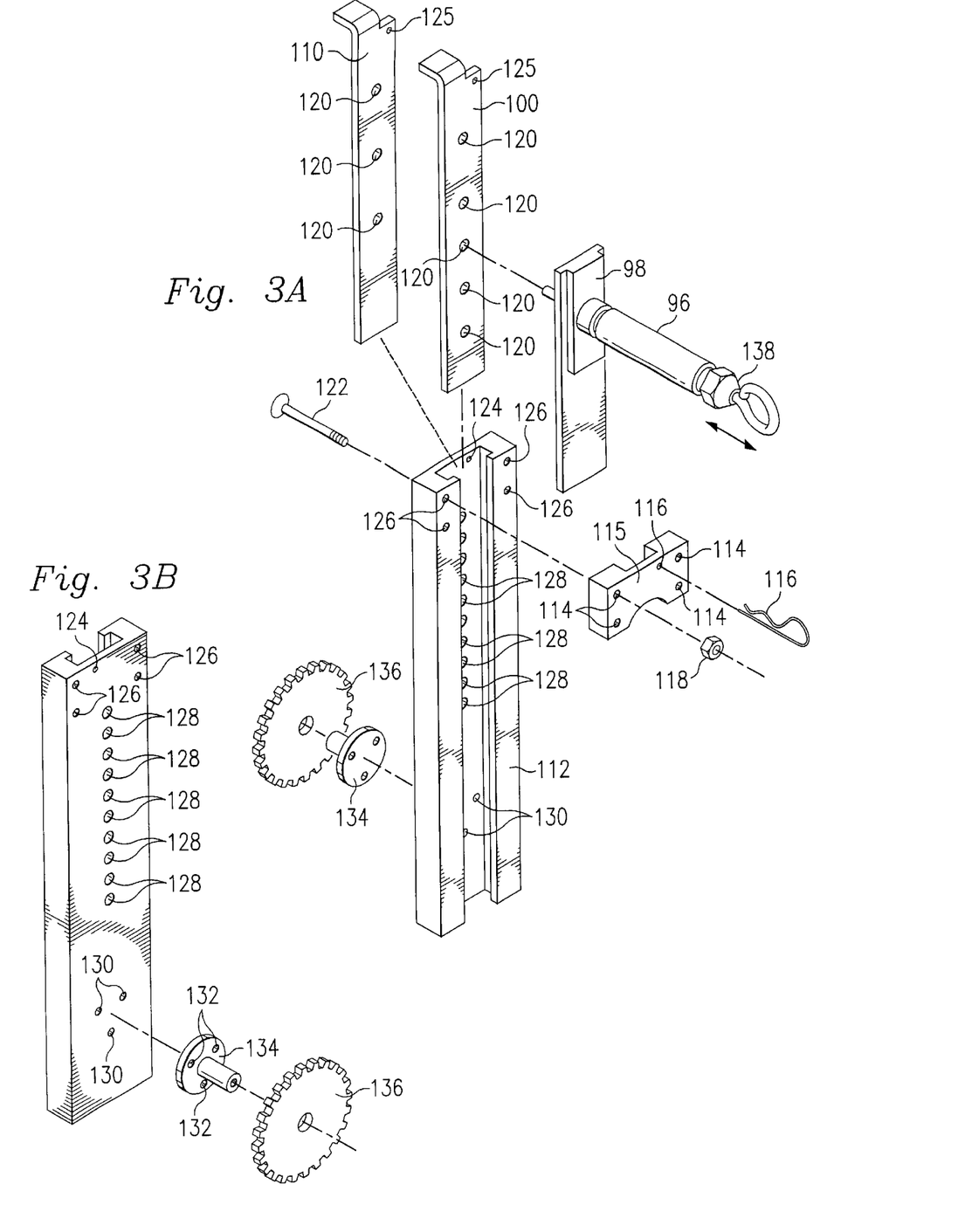

Now referring to FIG. 3a, the handle 96 and its base 98 form a 'T'; the base 98 slides inside a long flat rectangular tube 112. A template 100 guides the handle 96 at preset sites 128 in the long tube to give the riders different leverages or speeds. The rider would change leverages by pulling the rod 138 outward, which is spring activated, until it slips out of the holes 128 in the base and the holes 120 in the template 100, then slide the handle 96 up or down, until it catches the appropriate hole 120 in the template 100 and the appropriate hole 128 in the base. The template 100 and the handle base 98 are held into place by attaching block 115 with four nuts 122 and bolts 118 through base holes 126 and block holes 114. The template 100 is restricted in movement by attaching pin 116 through pin hole 125 in the template 100 and through pin hole 124 in the base.

Although, template 100 has five preset holes 120 and is used for advanced riders, another template 110 with three preset holes 120 may be used for beginners. The base 112 as configured, will accommodate both templates 100 and 110.

The base 112 is attached to an axle 134 and a chain sprocket 136. A chain (not shown) transfers the rotational movement from the chain sprocket 136 to ratcheting hub screwed onto the drive wheel (both ratcheting hub and drive wheel not shown in FIG. 3A or 3B).

FIG. 3B shows the back of base 112, along with the other sides of the axle 134 and the sprocket 136.

The preferred embodiment is implemented as the base 112 being composed of a flat square tube approximately 3" wide and ½" outside thickness and 20" long. The base 112 has holes 128 every ¾" on the side away from the rider. The 'T' handle subassembly 98 is implemented with a spring loaded rod and sleeve of aluminum bar stock ⅛" thick 1½" wide and 6" long. The handle 96 is composed of a hollow ½" inside diameter handle (not shown), that attaches to the 6" bar stock 98 to make a 'T'. A slightly larger sleeve (shown as outside of handle 96) fits over the ½" inside diameter tube. The sleeve allows rotation of the rider's hand as the rider rotates the crank handle. A spring-loaded rod 138 with a loop at one end fits inside the hollow tube. The loop projects outside the handle, toward the rider.

The template 100 is 1½" wide, ⅛" thick and 12" long with a plurality of holes 120 to vary the leverage of the handle. The clip 116 holds the inserted template 100 in place.

Figure 7:
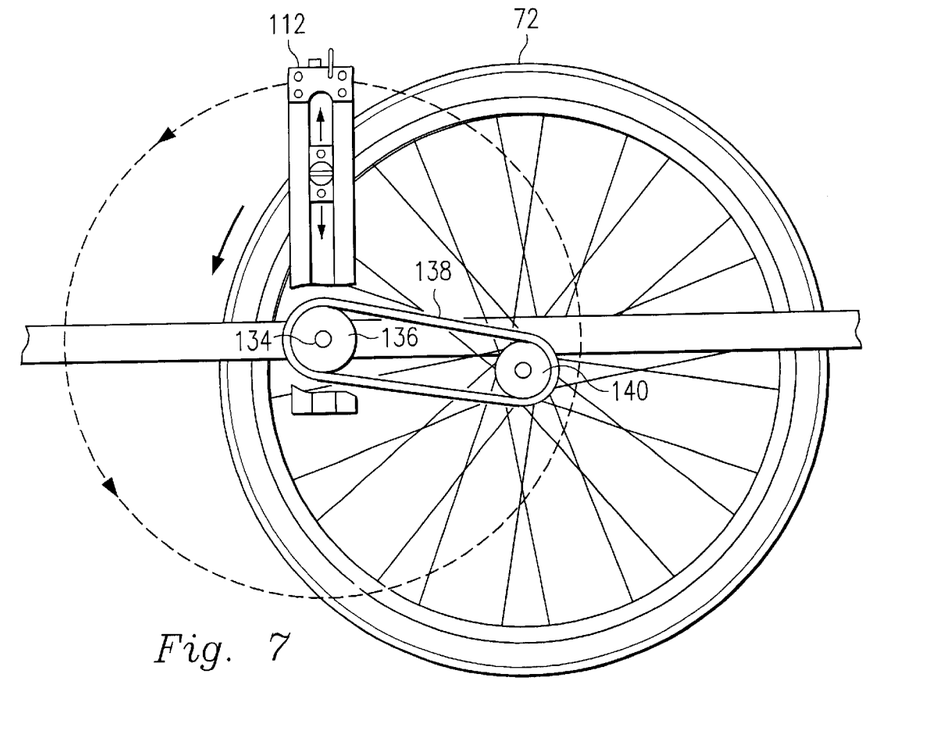
FIG. 7 shows the motions of the crank handle, the handle hub, and the ratcheting hub.

Referring to FIG. 7 now, the preferred embodiment of the Land Rower uses bicycle components for the drive wheels 72. The hand crank 112 is attached to a short axle 134. The base 112 is attached to an axle 134 and a chain sprocket 136. As stated earlier, the chain 138 transfers the rotational movement from the chain sprocket 136 to the ratcheting sprocket 140 screwed onto the drive wheel 72.

This embodiment is similar to a bicycle except the hand crank takes the place of the pedals on a bicycle. The preferred embodiment has an 18 tooth sprocket 136 driving an 18 tooth hub 140. If the rider wants a higher top speed, they can substitute a 24 tooth sprocket and a longer chain. Low speed, but more torque, can be obtained with a 12 tooth sprocket and a shorter chain.

Most bicycles have the chain and hub on the right side. This format works for the drive wheel for the Land Rower's left side, but not the right wheel. However, one solution is to screw the ratcheting hub assembly to the right wheel backwards. A keyway is then used to prevent the hub from unscrewing. Another solution is to reverse the thread on the right-hand wheel and hub to keep the hub from unscrewing.

Another alternative embodiment utilizes bicycle hubs like those available from Shimano (SG-7R40 and SG-7C21). They have seven speeds and come with and without brakes. The speeds are selected by a cable, which can be built into another handle 142 as shown in FIG. 8.

Yet another alternative embodiment utilizes wheelchair hubs similar to those used in U.S. Pat. Nos. 3,563,568 and 4,727,965. The designs embodied in those patents discuss ratcheting hubs for wheelchairs but clearly indicate standard wheelchairs with outside pushrims and the usual high sitting position. However, the wheelchair hubs encompassed in those designs could be adapted to have the pushrims, or another type of crank handle similar to that of the preferred embodiment, on the inside of the drive wheel.

Operation of the Land Rower

Now referring to FIG. 1 again, the rider sits down on the hammock 56, grabs the handles 96 and rotates them to the top. They then put their thumbs in the loops 138 of the spring-loaded rods and pull out. This action pulls the other ends of the rods out of the matching holes in the template (shown in detail in FIG. 3A). The rider then slides the handles 96 as far away from the axle 134 as possible and releases the loops 138. The other end of the spring-loaded rod drops through the matching holes in the template and tube assembly and locks into place (shown in detail in FIG. 3A). The Land Rower is now in first gear. The rider propels the Land Rover forward by rotating the handles forward.

As speed increases, the rider can change to second gear. With the handles 96 at the top, they put their thumbs in the loops 138, pull out, and then pull the handles 96 slightly toward the axle. They then release the loops 138 and continue to slide the handles 96 toward the axle 134. The rod end will be pressed against the template by the spring until it comes to the next hole (shown in detail in FIG. 3A). It will then drop into the hole and lock into place. This process is repeated as the terrain and speed varies. The drop and lock ability makes shifting very easy. In addition, if the hubs allow coasting, there is no reverse gear and the rider goes backwards by rotating the wheels by hand.

To change the ratios or number of gears, the rider changes templates in the right and left assemblies (shown as template 100 and 110 in FIG. 3A). They pull out the locking pins, pull out the old templates, insert the new templates, and insert the pins to lock them into place. The beginner's template has three easy gears while an advanced rider's has five harder ones. The templates can be changed out in about 10 seconds a side.

Figure 14:
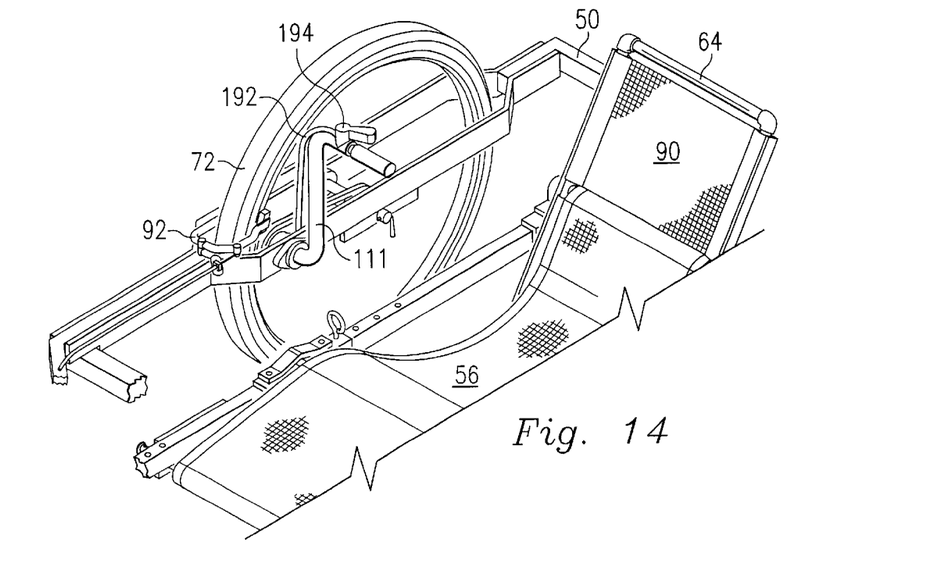
FIG. 14 shows an alternate embodiment for the gears.

If the Land Rower had the Shimano, or similar, multi-speed hubs implemented, the rider would just change gears by clicking the gear selection knob 194 as shown in FIG. 14. Moving the gear selection knob 194 would then change gears on either the wheel hub (not shown) or the handle hub (also not shown). The gear selection knob is attached to another handle 192 that just above the rider's hand path so that it is easy to change gears as the rider completes a rotation of the crank handle 111.

Options for Physically Challenged Riders

Figure 15:
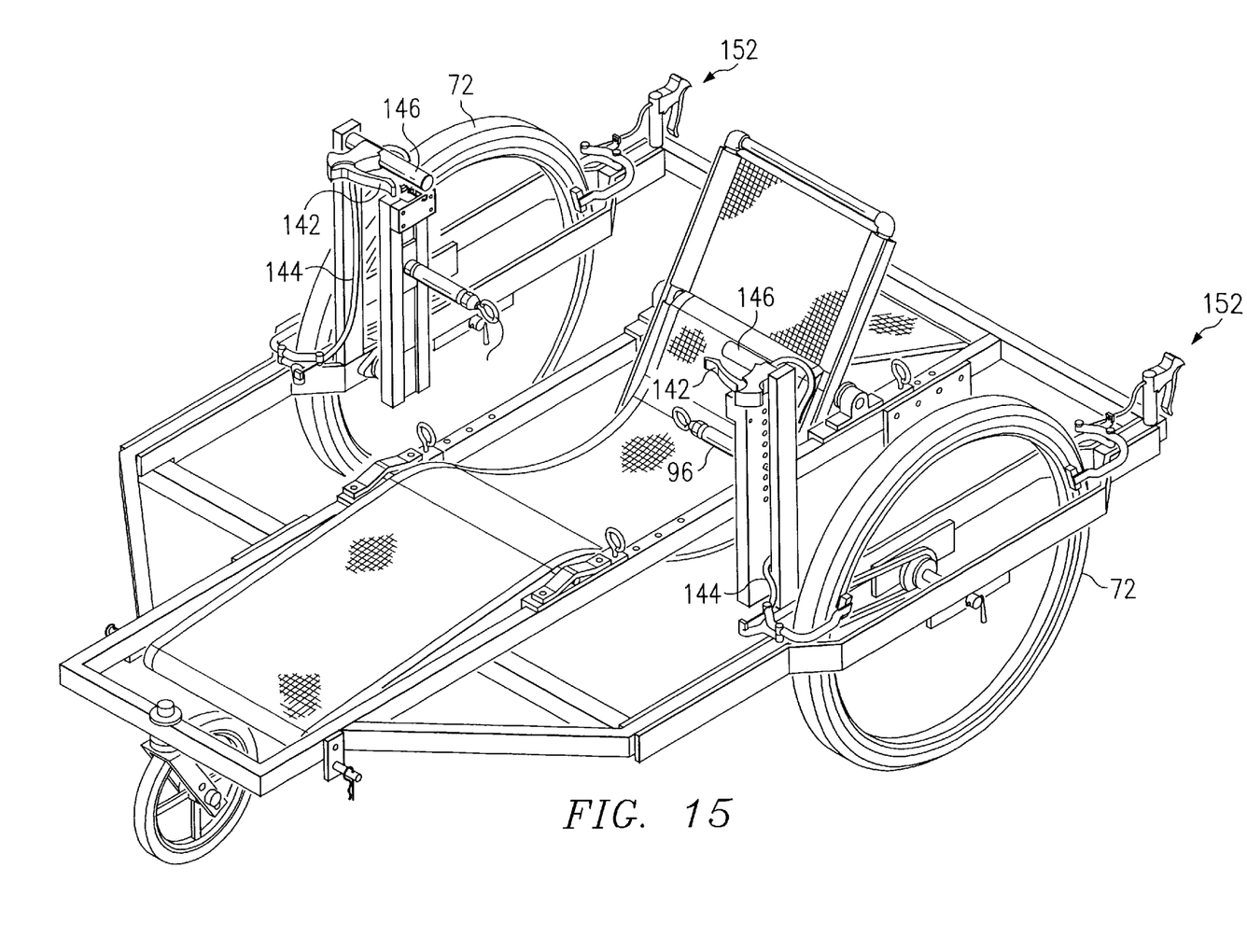
FIG. 15 shows an alternate embodiment adapted for physically challenged riders.

The preferred embodiment for physically challenged riders would omit the footrest brakes and have brake locks 152 as shown in FIG. 15. The brake locks 152 would lock the drive wheels 72 while the rider gets into the Land Rower. In addition, the gears and brakes could be implemented similarly to the handles and brakes of FIG. 8. However, the Shimano Nexxus hub is preferred for the brakes since the rider only need to reverse direction on the crank handle to brake.

Advantages

In sum, the Land Rower is intuitive to ride. The action of cranking the handles is like rowing. Its low center of gravity makes it inherently stable at any speed, including at rest. The design, propulsion method and pivoting backrest make it comfortable and fin to ride. The main skill for the rider to master is going around corners. The rider can brake the inside wheel and/or crank the outside wheel. This skill is easier and safer to learn than rollerblading or riding a bike.

Accordingly, the reader will see that the Land Rower is carefully and simply designed to give physically challenged people an alternative to current racing wheelchairs, as well as provide able-bodied people a unique, upper-body workout. It is a viable complement to running, biking or rollerblading. The Land Rower, as described, has at least seven important features.

The Land Rower has an efficient propulsion design. The rider uses a circular motion that produces power during the entire movement. The motion uses muscles in the arms, back, shoulders and abdomen, and is a very efficient use of the rider's efforts.

In addition, the drive mechanism has a plurality of leverage positions or speeds. In the template transmission version, the handles, set at right angles to the drive wheels, are positioned far from the axle when starting or going uphill. As speed increases and the need for leverage decreases, the rider shifts the handles closer to the axle. The mechanism can be easily modified to change the number of speeds and their leverage relationships. The drawings show a five-speed arrangement for an advanced rider. The geared transmission version uses existing drive hubs such as the Shimano 7-speed.

Furthermore, the drive mechanism has a coast or freewheel feature. Like a bicycle's pedals, the handles do not move when the rider is coasting.

Moreover, the seat incorporates a hammock, and adjustable location s for the pivoting back support, and leg and foot rests. The hammock is attached at the front and back of the chassis. The hammock gives a comfortable, lightweight, shock absorbing, ventilated seat. It passes through the pivoting back support, resting on top of the support's pivoting axle. The back support pivots with the rider's movement. The action is similar to rowing. The hammock gives seamless, constant support for the back to minimize back strain and fatigue.

Additionally, because the handles are on the inside, the rider can sit much lower. Wheelchairs typically have seat heights ranging from 12" to 15"; the Land Rower rider is about 5" above the ground. The rider's height can be adjusted by varying the length of the hammock. The drive mechanism lets the rider pivot the vehicle with one wheel stationary.

Like most bicycles, the Land Rower uses caliper brakes that squeeze the metal wheel rims. The brake levers can be mounted for either foot or hand activation. Hand controls are for riders with limited or no power in their legs. The right and left brakes can be applied independently for turning corners.

Lastly, the locations of the back, leg and foot supports can be adjusted for the riders. The third, pivoting wheel can be moved up and down to suit the rider and the racing conditions.

Although the description above has specific information, it should not be interpreted as limiting the scope of this invention but simply providing illustrations of some of the present aspects of this invention. For example, a snow going version would have wider drive wheels, or belts, and a pivoting ski in the front. The version for wheel-chair athletes can be shortened to accommodate folded legs. The scope of this invention should be determined by the appended claims and their legal equivalents, rather than by the examples given.

I claim:

1. A hand-propelled wheeled device for a rider comprising:
   a frame with two sides;
   a first and second drive wheel rotatably mounted to the two sides by at least one axis;
   a first hand crank movable in a full 360 degree circular motion, located between the rider and drive wheel, and connected to the first drive wheel through a first crank hub and a first wheel hub that is connected to and rotates the first drive wheel;
   a second hand crank movable in a full 360 degree circular motion, located between the rider and the drive wheel, and connected to the second drive wheel through a second crank hub and a second wheel hub that is connected to and rotates the second drive wheel;
   a rider's seat positioned such that the bottom of the seat extends lower than the at least one drive wheel axis;
   a support connected to the frame;
   a braking mechanism to retard movement of the first and second drive wheels; and a shifting mechanism which includes a plurality of positions of the first hand crank at different distances from the rotational center of the first hand crank whereby the plurality of positions change the leveraging ratio between the first hand crank and the first drive wheel;
   wherein the shifting mechanism changes the leveraging ratio between the first hand crank and the first drive wheel by changing between a plurality of sprockets on the first crank hub.

2. A hand-propelled wheeled device for a rider comprising:
   a frame with two sides;
   a first and second drive wheel rotatably mounted to the two sides by at least one axis;
   a first hand crank movable in a full 360 degree circular motion, located between the rider and drive wheel, and connected to the first drive wheel through a first crank hub and a first wheel hub that is connected to and rotates the first drive wheel;
   a second hand crank movable in a full 360 degree circular motion, located between the rider and the drive wheel, and connected to the second drive wheel through a second crank hub and a second wheel hub that is connected to and rotates the second drive wheel;
   a rider's seat positioned such that the bottom of the seat extends lower than the at least one drive wheel axis;
   a support connected to the frame;
   a braking mechanism to retard movement of the first and second drive wheels; and a shifting mechanism which includes a plurality of positions of the first hand crank at different distances from the rotational center of the first hand crank whereby the plurality of positions change the leveraging ratio between the first hand crank and the first drive wheel; wherein the shifting mechanism changes the leveraging ratio between the second hand crank and the second drive wheel by changing between a plurality of sprockets on the second crank hub.

3. A hand-propelled wheeled device for a rider comprising:
   a frame with two sides;
   a first and second drive wheel rotatably mounted to the two sides by at least one axis;
   a first hand crank movable in a full 360 degree circular motion, located between the rider and drive wheel, and connected to the first drive wheel through a first crank hub and a first wheel hub that is connected to and rotates the first drive wheel;
   a second hand crank movable in a full 360 degree circular motion, located between the rider and the drive wheel, and connected to the second drive wheel through a second crank hub and a second wheel hub that is connected to and rotates the second drive wheel;
a rider's seat positioned such that the bottom of the seat extends lower than the at least one drive wheel axis;
a support connected to the frame;
a braking mechanism to retard movement of the first and second drive wheels; and a shifting mechanism which includes a plurality of positions of the first hand crank at different distances from the rotational center of the first hand crank whereby the plurality of positions change the leveraging ratio between the first hand crank and the first drive wheel;
wherein the shifting mechanism changes the leveraging ratio between the first hand crank and the first drive wheel by changing between a plurality of sprockets on the first wheel hub.

4. A hand-propelled wheeled device for a rider comprising:
a frame with two sides;
a first and second drive wheel rotatably mounted to the two sides by at least one axis;
a first hand crank movable in a full 360 degree circular motion, located between the rider and drive wheel, and connected to the first drive wheel through a first crank hub and a first wheel hub that is connected to and rotates the first drive wheel;
a second hand crank movable in a full 360 degree circular motion, located between the rider and the drive wheel, and connected to the second drive wheel through a second crank hub and a second wheel hub that is connected to and rotates the second drive wheel;
a rider's seat positioned such that the bottom of the seat extends lower than the at least one drive wheel axis;
a support connected to the frame;
a braking mechanism to retard movement of the first and second drive wheels; and a shifting mechanism which includes a plurality of positions of the first hand crank at different distances from the rotational center of the first hand crank whereby the plurality of positions change the leveraging ratio between the first hand crank and the first drive wheel;
wherein the shifting mechanism changes the leveraging ratio between the second hand crank and the second drive wheel by changing between a plurality of sprockets on the second wheel hub.

5. A hand-propelled wheeled device for a rider, the device comprising:
a first hand crank;
a first crank hub rotated by the first hand crank;
a first drive wheel rotated by the first crank hub;
a second hand crank;
a second crank hub rotated by the second hand crank;
a second drive wheel rotated by the second crank hub;
at least one axis connecting the first drive wheel and the second drive wheel to the wheeled device;
a rider's seat positioned such that the bottom of the seat extends lower than the at least one drive wheel axis; and
a shifting mechanism which includes a plurality of positions for the first hand crank at different distances from the rotational center of the first hand crank whereby the plurality of positions change the leveraging ratio between the first hand crank and the first drive wheel;
further including a hammock style seat;
wherein the hammock style seat includes a means for adjusting a total length of the hammock.

6. The wheeled device of claim 5, further including a support connected to a frame.

7. The wheeled device of claim 5, wherein the first and second drive wheels each have the ability to coast.

8. A hand-propelled wheeled device for a rider, the device comprising:
a first hand crank;
a first crank hub rotated by the first hand crank;
a first drive wheel rotated by the first crank hub;
a second hand crank;
a second crank hub rotated by the second hand crank;
a second drive wheel rotated by the second crank hub;
at least one axis connecting the first drive wheel and the second drive wheel to the wheeled device;
a rider's seat positioned such that the bottom of the seat extends lower than the at least one drive wheel axis; and
a shifting mechanism which includes a plurality of positions for the first hand crank at different distances from the rotational center of the first hand crank whereby the plurality of positions change the leveraging ratio between the first hand crank and the first drive wheel;
further including a pivoting backrest connected to the frame, wherein the pivoting backrest provides continuous support to the rider, and the backrest pivots as the rider changes position as the vehicle is propelled.

9. A hand-propelled wheeled device for a rider, the device comprising:
a first hand crank;
a first crank hub rotated by the first hand crank;
a first drive wheel rotated by the first crank hub;
a second hand crank;
a second crank hub rotated by the second hand crank;
a second drive wheel rotated by the second crank hub;
at least one axis connecting the first drive wheel and the second drive wheel to the wheeled device;
a rider's seat positioned such that the bottom of the seat extends lower than the at least one drive wheel axis; and
a shifting mechanism which includes a plurality of positions for the first hand crank at different distances from the rotational center of the first hand crank whereby the plurality of positions change the leveraging ratio between the first hand crank and the first drive wheel;
further including an integrated seating assembly that combines a hammock style seat with a pivoting backrest.

10. A hand-propelled wheeled device for a rider, the device comprising:
a first hand crank;
a first crank hub rotated by the first hand crank;
a first drive wheel rotated by the first crank hub;
a second hand crank;
a second crank hub rotated by the second hand crank;
a second drive wheel rotated by the second crank hub;
at least one axis connecting the first drive wheel and the second drive wheel to the wheeled device;
a rider's seat positioned such that the bottom of the seat extends lower than the at least one drive wheel axis; and a shifting mechanism which includes a plurality of positions for the first hand crank at different distances from the rotational center of the first hand crank whereby the plurality of positions change the leveraging ratio between the first hand crank and the first drive wheel;

further including separate and independent brakes for the right and left drive wheels, and wherein the brakes can be activated without removing the rider's hands from the two drive handles.

11. A hand-propelled wheeled device for a rider, the device comprising:

a first hand crank;

a first crank hub rotated by the first hand crank;

a first drive wheel rotated by the first crank hub;

a second hand crank;

a second crank hub rotated by the second hand crank;

a second drive wheel rotated by the second crank hub;

at least one axis connecting the first drive wheel and the second drive wheel to the wheeled device;

a rider's seat positioned such that the bottom of the seat extends lower than the at least one drive wheel axis; and a shifting mechanism which includes a plurality of positions for the first hand crank at different distances from the rotational center of the first hand crank whereby the plurality of positions change the leveraging ratio between the first hand crank and the first drive wheel;

further including separate and independent brakes for the right and left drive wheels.

12. A hand-propelled wheeled device for a rider, the device comprising:

a first hand crank;

a first crank hub rotated by the first hand crank;

a first drive wheel rotated by the first crank hub;

a second hand crank;

a second crank hub rotated by the second hand crank;

a second drive wheel rotated by the second crank hub;

at least one axis connecting the first drive wheel and the second drive wheel to the wheeled device;

a rider's seat positioned such that the bottom of the seat extends lower than the at least one drive wheel axis; and a shifting mechanism which includes a plurality of positions for the first hand crank at different distances from the rotational center of the first hand crank whereby the plurality of positions change the leveraging ratio between the first hand crank and the first drive wheel;

further including adjustable locations for the footrest.

13. A hand-propelled wheeled device for a rider, the device comprising:

a first hand crank;

a first crank hub rotated by the first hand crank;

a first drive wheel rotated by the first crank hub;

a second hand crank;

a second crank hub rotated by the second hand crank;

a second drive wheel rotated by the second crank hub;

at least one axis connecting the first drive wheel and the second drive wheel to the wheeled device;

a rider's seat positioned such that the bottom of the seat extends lower than the at least one drive wheel axis; and a shifting mechanism which includes a plurality of positions for the first hand crank at different distances from the rotational center of the first hand crank whereby the plurality of positions change the leveraging ratio between the first hand crank and the first drive wheel;

further including adjustable locations for a knee support.

14. A hand-propelled wheeled device for a rider, the device comprising:

a first hand crank;

a first crank hub rotated by the first hand crank;

a first drive wheel rotated by the first crank hub;

a second hand crank;

a second crank hub rotated by the second hand crank;

a second drive wheel rotated by the second crank hub;

at least one axis connecting the first drive wheel and the second drive wheel to the wheeled device;

a rider's seat positioned such that the bottom of the seat extends lower than the at least one drive wheel axis; and a shifting mechanism which includes a plurality of positions for the first hand crank at different distances from the rotational center of the first hand crank whereby the plurality of positions change the leveraging ratio between the first hand crank and the first drive wheel;

further including adjustable locations for a backrest.

* * * * *